(12) United States Patent
Wu et al.

(10) Patent No.: US 11,630,479 B2
(45) Date of Patent: Apr. 18, 2023

(54) APPARATUS FOR ADJUSTING SKEW OF CIRCUIT SIGNAL AND ADJUSTING METHOD THEREOF

(71) Applicants: Global Unichip Corporation, Hsinchu (TW); Taiwan Semiconductor Manufacturing Co., Ltd., Hsinchu (TW)

(72) Inventors: Tse-Wei Wu, Hsinchu (TW); Chen-Yuan Kao, Hsinchu (TW); Min-Hsiu Tsai, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 321 days.

(21) Appl. No.: 16/921,950

(22) Filed: Jul. 7, 2020

(65) Prior Publication Data
US 2021/0341962 A1   Nov. 4, 2021

(30) Foreign Application Priority Data
Apr. 30, 2020 (TW) ................................ 109114582

(51) Int. Cl.
*G06F 1/10* (2006.01)
(52) U.S. Cl.
CPC ..................................... *G06F 1/10* (2013.01)
(58) Field of Classification Search
CPC ........ G06F 1/10; G06F 5/065; G06F 2119/12; G06F 30/396
See application file for complete search history.

(56) References Cited

U.S. PATENT DOCUMENTS

| 8,205,182 B1* | 6/2012 | Zlatanovici | G06F 30/398 |
| | | | 716/113 |
| 9,135,375 B1* | 9/2015 | Sood | G06F 30/00 |
| 2008/0168412 A1 | 7/2008 | Cheon et al. | |
| 2012/0110538 A1* | 5/2012 | Shih | G06F 30/394 |
| | | | 716/129 |

FOREIGN PATENT DOCUMENTS

| CN | 1574628 | 2/2005 |
| CN | 104077427 | 10/2014 |
| CN | 110688723 | 1/2020 |
| TW | 200802011 | 1/2008 |

OTHER PUBLICATIONS

"Office Action of Taiwan Counterpart Application", dated Dec. 2, 2021, p. 1-p. 6.

\* cited by examiner

*Primary Examiner* — Jaweed A Abbaszadeh
*Assistant Examiner* — Hyun Soo Kim
(74) *Attorney, Agent, or Firm* — JCIPRNET

(57) ABSTRACT

An apparatus for adjusting skew of circuit signal and an adjusting method thereof are provided. The adjusting method includes: providing a controller for executing: based on each of a plurality of clock signals, dividing a circuit to generate a plurality of circuit partitions according to a netlist of the circuit; grouping the circuit partitions to respectively generate a plurality of circuit groups; identifying adjacent states of layout areas of the circuit groups; and, adjusting a skew value of each of the circuit groups according to the adjacent states.

13 Claims, 8 Drawing Sheets

APPARATUS FOR ADJUSTING SKEW OF CIRCUIT SIGNAL AND ADJUSTING METHOD THEREOF

CROSS-REFERENCE TO RELATED APPLICATION

This application claims the priority benefit of Taiwan application serial no. 109114582, filed on Apr. 30, 2020. The entirety of the above-mentioned patent application is hereby incorporated by reference herein and made a part of this specification.

BACKGROUND

Field of the Disclosure

The disclosure relates to an apparatus for adjusting skew of circuit signals and an adjusting method thereof, and in particular to an apparatus for adjusting skew of circuit signals and performing analysis according to a clock tree and an adjusting method thereof.

Description of Related Art

In the field of circuit design, during the operation of circuit, a large number of registers might encounter transition phenomenon at the same time point, resulting in a situation where the operating voltage is instantaneously loaded and the voltage drops consequently. In order to avoid such a situation, it is necessary to adjust the skew value in the circuit as appropriate.

In the conventional technical field, designers need to take various factors in the circuit into consideration, such as the configuration of the clock signal, the power consumption of the circuit, and the physical layout area, in order to effectively adjust the skew value. Nowadays, for existing circuits which are more complicated in structure, analyzing the circuits is time consuming.

In addition, in the conventional technical field, designers often take the number of registers in the circuit into consideration only, and such skew adjusting operation can only make little improvement in circuit efficiency.

SUMMARY OF THE DISCLOSURE

The disclosure provides a circuit signal skew adjusting apparatus and an adjusting method thereof, which can easily adjust the signal skew in the circuit and improve the performance quality of the circuit.

The circuit signal skew adjusting method of the disclosure includes: providing a controller for executing: based on each of a plurality of clock signals, dividing a circuit to generate a plurality of circuit partitions according to a netlist of the circuit; grouping the circuit partitions to respectively generate a plurality of circuit groups; identifying adjacent states of layout areas of the circuit groups; and, adjusting a skew value of each of the circuit groups according to the adjacent states.

The circuit signal skew adjusting apparatus of the disclosure includes a controller and a memory element. The controller is coupled to the memory element and is configured to perform the circuit signal skew adjusting method described above.

Based on the above, the disclosure divides the circuits and groups the circuits, identifies the adjacent states of the layout areas of the circuit groups, and adjusts the skew value of each of the circuit groups according to the adjacent states of the circuit groups, thereby simplifying the circuit signal skew adjusting operation, such that adjustment of circuit skew can be completed while the signal quality and design time can be controlled properly.

DESCRIPTION OF EMBODIMENTS

Figure 1:
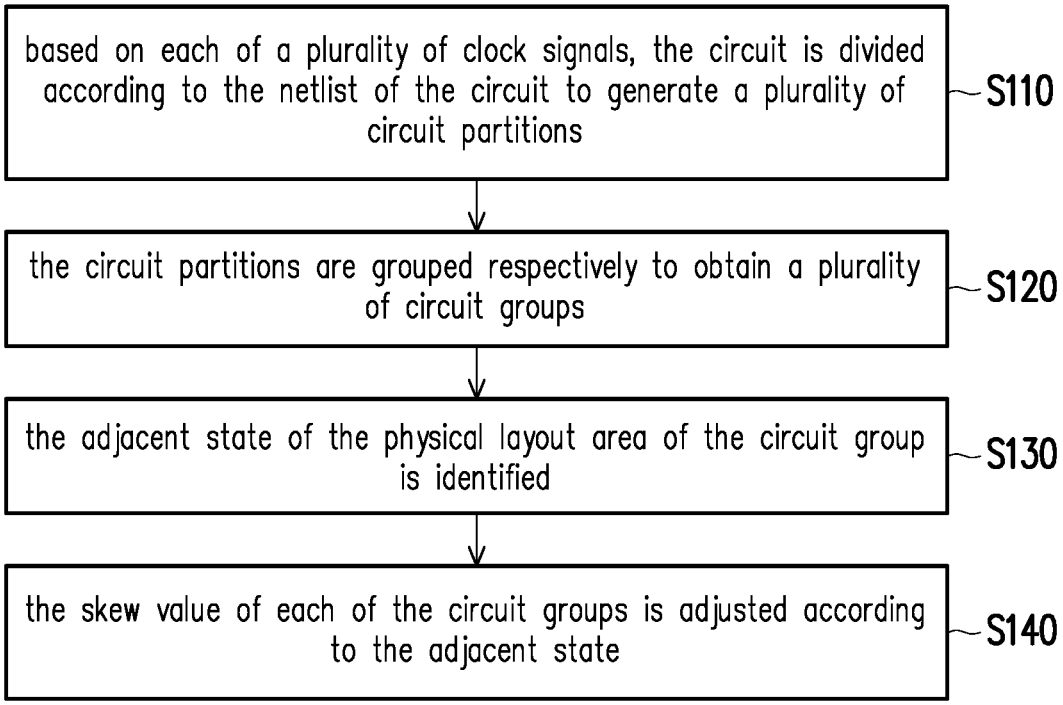
FIG. 1 is a flowchart of a circuit signal skew adjusting method according to an embodiment of the disclosure.

Please refer to FIG. 1, FIG. 1 is a flowchart of a circuit signal skew adjusting method according to an embodiment of the disclosure. The operation flow in the embodiment of the disclosure can be performed based on a netlist of a circuit. Specifically, in step S110, based on each of a plurality of clock signals in the circuit, the circuit is divided according to the netlist of the circuit to generate a plurality of circuit partitions. Moreover, in step S110, the plurality of circuit partitions generated by dividing the circuit can respectively generate corresponding partition trees. The partition tree can be configured to represent the framework of the corresponding circuit partition.

In addition, in step S120, the circuit partitions are grouped respectively to obtain a plurality of circuit groups, and the grouping operation can be utilized to reduce the size of the partition tree of each of the circuit partitions and reduce the complexity of calculation.

Next, in step S130, the adjacent state of the physical layout area of the circuit group in the circuit is identified, and in step S140, the skew value of each of the circuit groups is adjusted according to the adjacent state.

In the embodiment of the disclosure, the circuit dividing operation in step S110 is performed according to the netlist of the circuit in a top-down manner. In step S120, the grouping operation for the circuit partition is performed in a bottom-up manner. Here, please note that, through the partitioning and grouping operations performed on the circuit, the disclosure can effectively simplify the complexity of skew analysis, and perform circuit skew value adjusting operation according to the adjacent state of the circuit group, so that the analysis speed of the circuit skew can be improved under the premise of taking into account the performance of the circuit.

Figure 2:
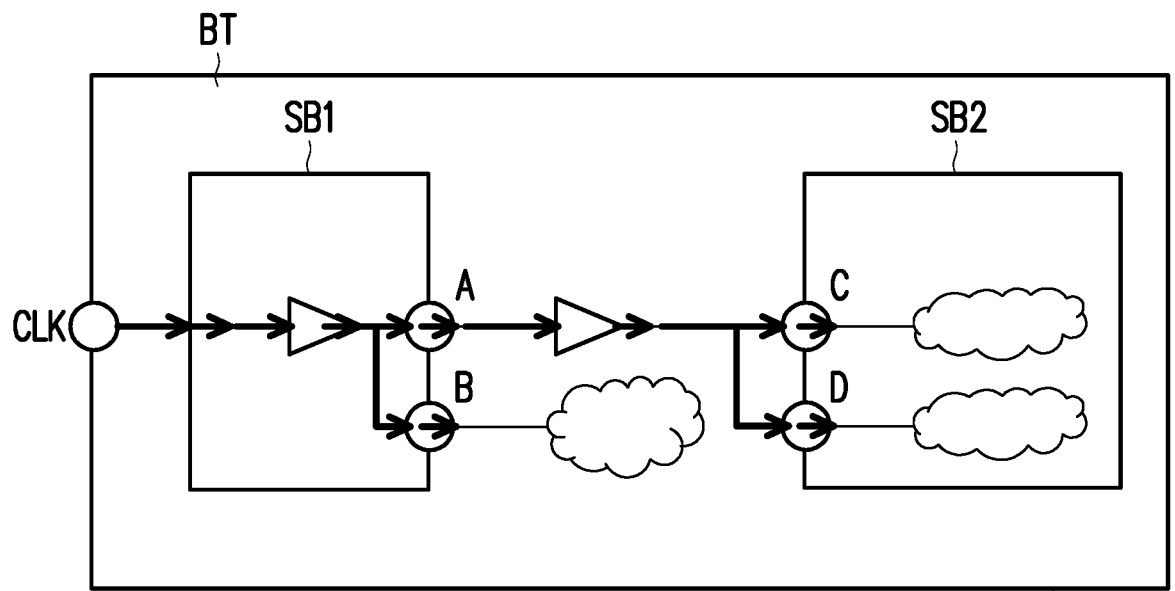
FIG. 2, FIG. 3A and FIG. 3B are schematic views showing a circuit partition generating method according to an embodiment of the disclosure.
Figure 3A:
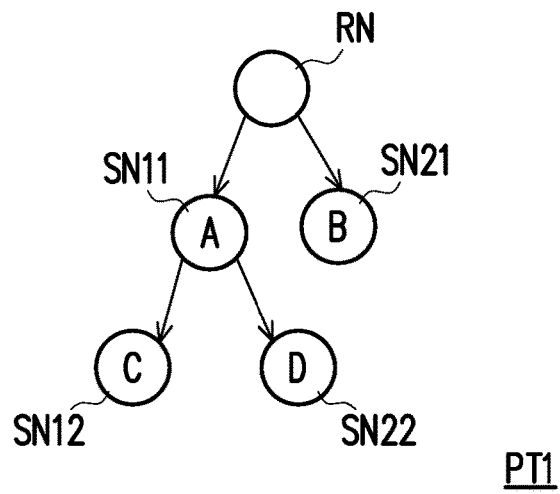
Figure 3B:
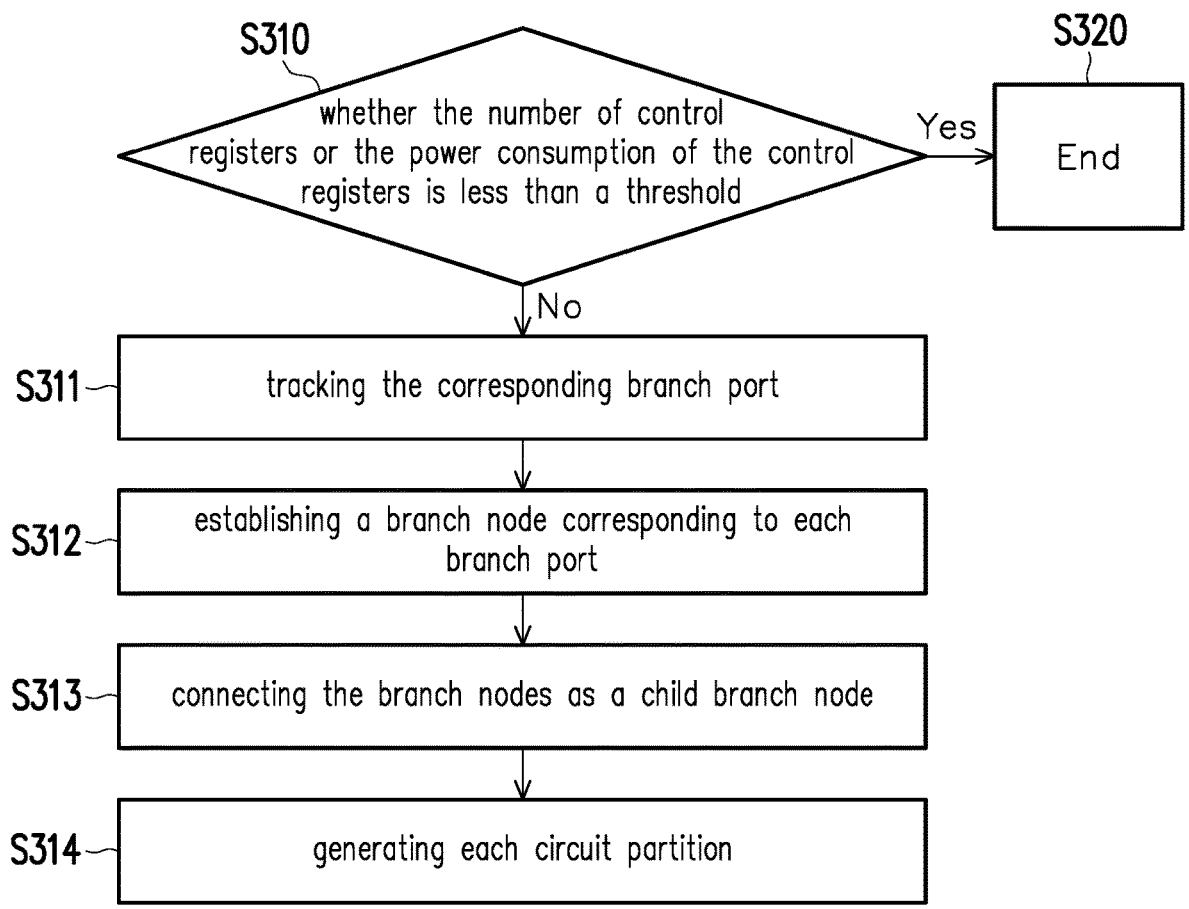

Please refer to FIG. 2, FIG. 3A and FIG. 3B below. FIG. 2, FIG. 3A and FIG. 3B are schematic views showing a circuit partition generating method according to an embodiment of the disclosure. In FIG. 2, the circuit 200 is a part of a complete circuit.

The circuit 200 has an upper block BT, and the upper block BT includes lower blocks SB1 and SB2. The circuit 200 operates based on the clock signal CLK. The circuit 200 is tracked based on the clock signal CLK, and branch ports A and B can be obtained in the lower block SB1. Starting from the branch port A and tracking in the direction of the lower block SB2, branch ports C and D can be obtained.

FIG. 3A shows a partition tree PT1 generated corresponding to the circuit tracking operation described above. FIG. 3B shows the operation flow of establishing the partition tree PT1. Specifically, in the initial state of circuit tracking, the root node RN of the partition tree PT1 may be generated. Next, in FIG. 3B, when each branch port is found, step S310 can be performed and it can be determined whether the number of control registers or the power consumption of the control registers on each branch port is less than a predetermined threshold. When the number of control registers or the power consumption of the control registers on the branch port is less than the predetermined threshold, the tracking operation on the path can be terminated (step S320). Conversely, when the number of the control registers or the power consumption of the control registers on the branch port is not less than the predetermined threshold, tracking is performed on the corresponding branch port (step S311). Then, in step S312, a branch node is established in the partition tree corresponding to each branch port. And in step S313, the branch nodes are connected as a child branch node. In step S314, the generating operation of each circuit partition is completed.

Taking the circuit 200 in FIG. 2 as an example, in FIG. 3A, when the branch ports A and B are found in the circuit tracking operation, branch nodes SN11 and SN21 can be established according to the branch ports A and B, respectively. The branch nodes SN11 and SN21 are connected to the root node RN. Specifically, the branch nodes SN11 and SN21 may be child branch nodes of the root node RN, and the opposite root node RN is a parent node of the branch nodes SN11 and SN21. Here, the number of control registers or the power consumption of the control registers of the branch port A and the branch port B is determined. For example, if the number of control registers or the power consumption of the control registers of the branch port B is less than a threshold, then the tracking of the circuit downstream of the branch port B can be terminated. If the number of control registers or the power consumption of the control registers of the branch port A is not less than the threshold, the circuit downstream of the branch port A is tracked, and the branch ports C and D on the lower block SB2 are obtained. Corresponding to the branch ports C and D, branch nodes SN12 and SN22 can be established respectively.

Following the above, if it is determined that the number of control registers or the power consumption of the control registers of the branch ports C and D is less than the threshold, the tracking operation of the circuit 200 may be ended. While ending the tracking operation of the circuit 200, the circuit dividing operation can be completed. The establishment of the partition tree PT1 corresponding to the circuit 200 can also be completed.

Figure 4:
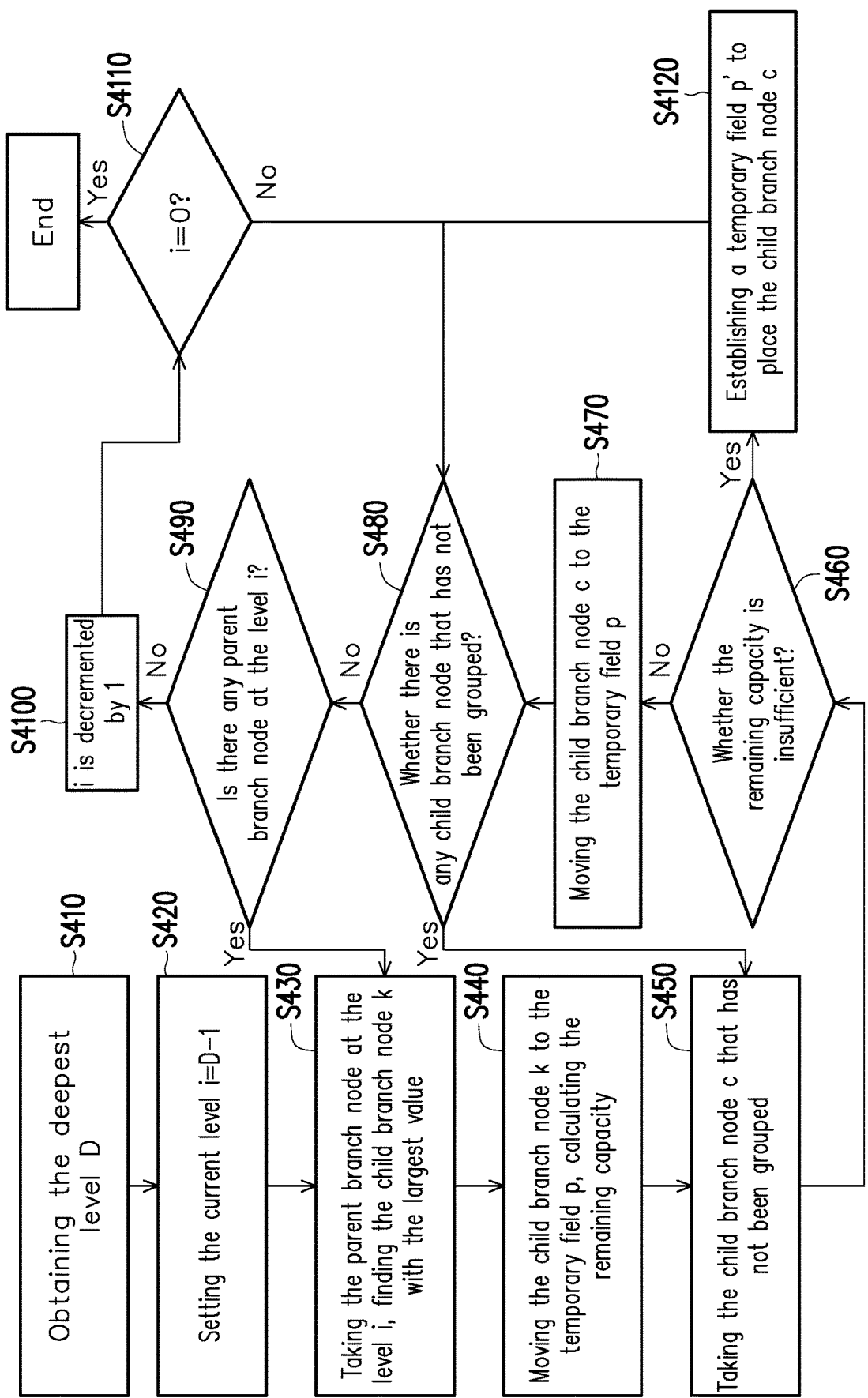
FIG. 4 and FIG. 5A to FIG. 5B are schematic views illustrating grouping operation of circuit partitions according to an embodiment of the disclosure.
Figure 5A:
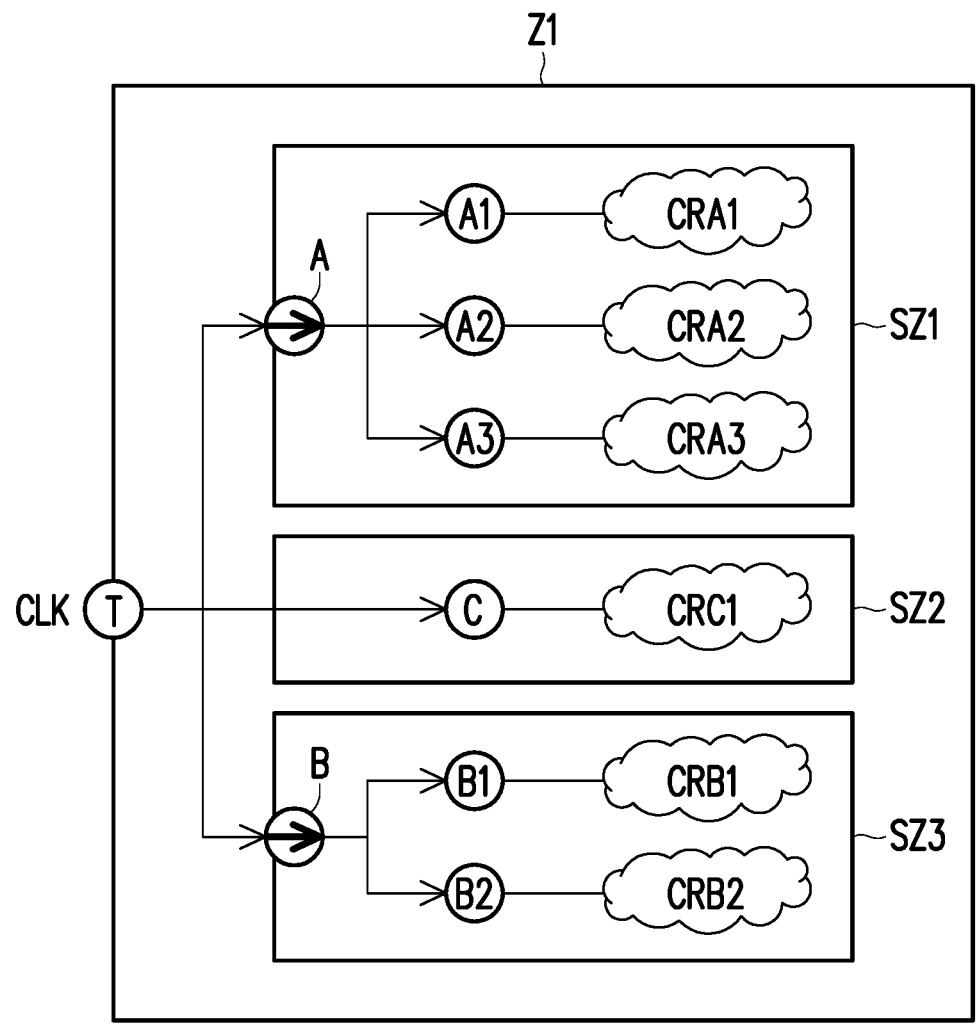
Figure 5B:
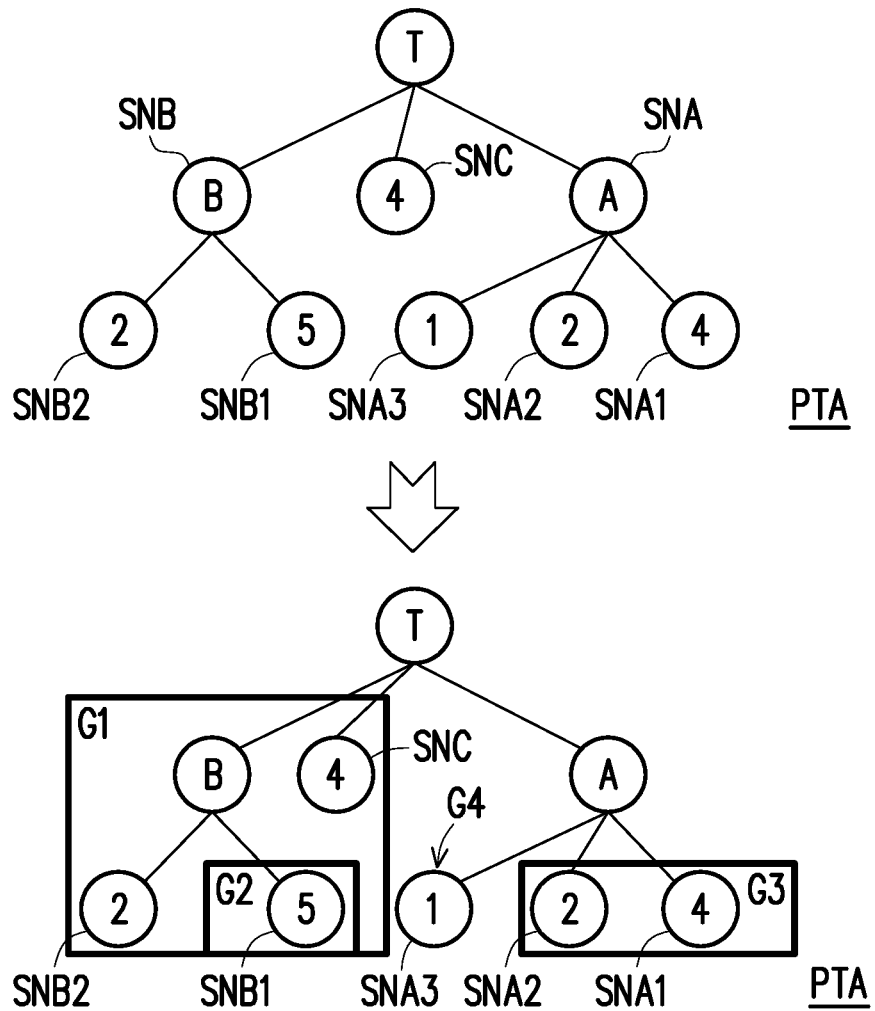

Please refer to FIG. 4 and FIG. 5A to FIG. 5B below. FIG. 4 and FIG. 5A to FIG. 5B are schematic views illustrating grouping operation of circuit partitions according to an embodiment of the disclosure. Specifically, FIG. 4 is a flowchart of performing the grouping operation on the circuit partition. In step S410, the deepest level D is obtained for the partition tree of each of the circuit partitions, and in step S420, the current level is set to level i, where i=D−1. In other words, the current level (level i) is the level before the deepest level D.

Next, in step S430, the branch node corresponding to the deepest level D in the level i is taken as the child branch node, and the parent branch node corresponding to the child branch node in the level i is taken.

It should be noted here that in the partition tree of each circuit partition, the branch nodes therein have a plurality of values, wherein the above plurality of values respectively represent the number of registers or power consumption corresponding to the branch nodes.

In step S440, a temporary field p is created, wherein the temporary field p has a capacity value. In step S440, it is determined that the child branch node k among the child branch nodes has the largest value, and the child branch node k is moved to the temporary field p. In addition, the capacity value of the temporary field p is subtracted from the value of the child branch node k, and the remaining capacity value of the temporary field p is obtained.

In step S450, another child branch node c of the plurality of branch nodes that has not been grouped is taken. Step S460 determines whether the remaining capacity value of the temporary field p is greater than the value of the child branch node c to determine whether the remaining capacity of the temporary field p is insufficient. If the remaining capacity of the temporary field p is insufficient, another temporary field p' is created, and the child branch node c is placed in the temporary field p' (step S4120), and step S480 is re-executed. Conversely, if the remaining capacity of the temporary field p is sufficient, the child branch node c is moved to the temporary field p, and the remaining capacity of the temporary field p is calculated again (step S470).

In step S480, it is determined whether there is a child branch node that has not been grouped in the level D. If there are still ungrouped child branch nodes, steps S450 to S470 are repeatedly executed until all the child branch nodes in the level D are grouped. Then step S490 is executed.

In step S490, it is determined whether there is another parent branch node in the current level i. If there are other parent branch nodes, step S430 is re-executed to perform grouping operation on the child branch nodes of another parent branch node. Conversely, if there are no other parent branch nodes, i is decremented by 1 (step S4100).

In step S4110, it is determined whether i is equal to 0, and when i=0, the grouping operation of the circuit partition is ended. In addition, if i is not equal to 0, step S480 is executed again. Specifically, when i=0, it means that all levels of branch nodes have been grouped.

In the implementation example of FIG. 5A to FIG. 5B, the circuit partition Z1 includes the connection port T and the sub-circuit partitions SZ1 to SZ3. The connection port T receives the clock signal CLK. The circuit partition SZ1 includes a branch port A and sub-branch ports A1 to A3. The sub-branch ports A1 to A3 respectively correspond to the connection circuits CRA1 to CRA3, and the circuits CRA1 to CRA3 respectively have the same or different number of control registers or power consumption of the control registers. The circuit partition SZ3 includes a branch port B and sub-branch ports B1 and B2. The sub-branch ports B1 and B3 respectively correspond to the connection circuits CRB1 and CRB2, and the circuits CRB1 and CRB2 respectively have different number of control registers or power consumption of the control registers. The circuit partition SZ2 includes a branch port C. The branch port C corresponds to the connection circuit CRC.

In the embodiment of the disclosure, the partition tree PTA can be established according to the circuit partition Z1. The partition tree PTA has multiple branch nodes SNA, SNB, SNC, SNA1 to SNA3, SNB1, and SNB2. The branch nodes SNA, SNB, SNC, SNA1 to SNA3, SNB1, and SNB2 respectively correspond to the branch ports A, B, C, and the sub-branch ports A1 to A3, B1, and B2. In the partition tree PTA, the branch nodes SNC, SNA1 to SNA3, SNB1, and SNB2 at the bottom layer respectively record multiple values. In this embodiment, the branch nodes SNC, SNA1 to SNA3, SNB1, and SNB2 respectively record the values of 4, 4, 2, 1, 5, 2. The values recorded in each of the branch nodes SNC, SNA1 to SNA3, SNB1 and SNB2 respectively represent the number of control registers connected to the corresponding branch ports or the value of power consumption of the control registers. Taking the number of control registers as an example, the value 4 recorded by the branch node SNA1 can represent that the sub-branch port A1 is connected to 4000 control registers.

Then, through a partition algorithm, a grouping operation can be performed on the partition tree PTA, and multiple circuit groups G1 to G4 are generated. The grouping operation of this embodiment can be adjusted based on the uniformity of the sum of the values of the plurality of groups in the circuit groups G1 to G4. The so-called sum of group values is the sum of the values recorded in all branch nodes included in each of the circuit groups. Taking the circuit group G1 as an example, the sum of group values of the circuit group G1 can be equal to the sum of the values in the branch nodes SNB1, SNB2, and SNC(=2+5+4=11). The uniformity of the sum of values of multiple groups can be obtained through the standard deviation of the sum of values of the multiple groups. In this embodiment, the grouping operation of the partition algorithm can be performed by minimizing the standard deviation of the sum of values of the multiple groups.

Figure 6:
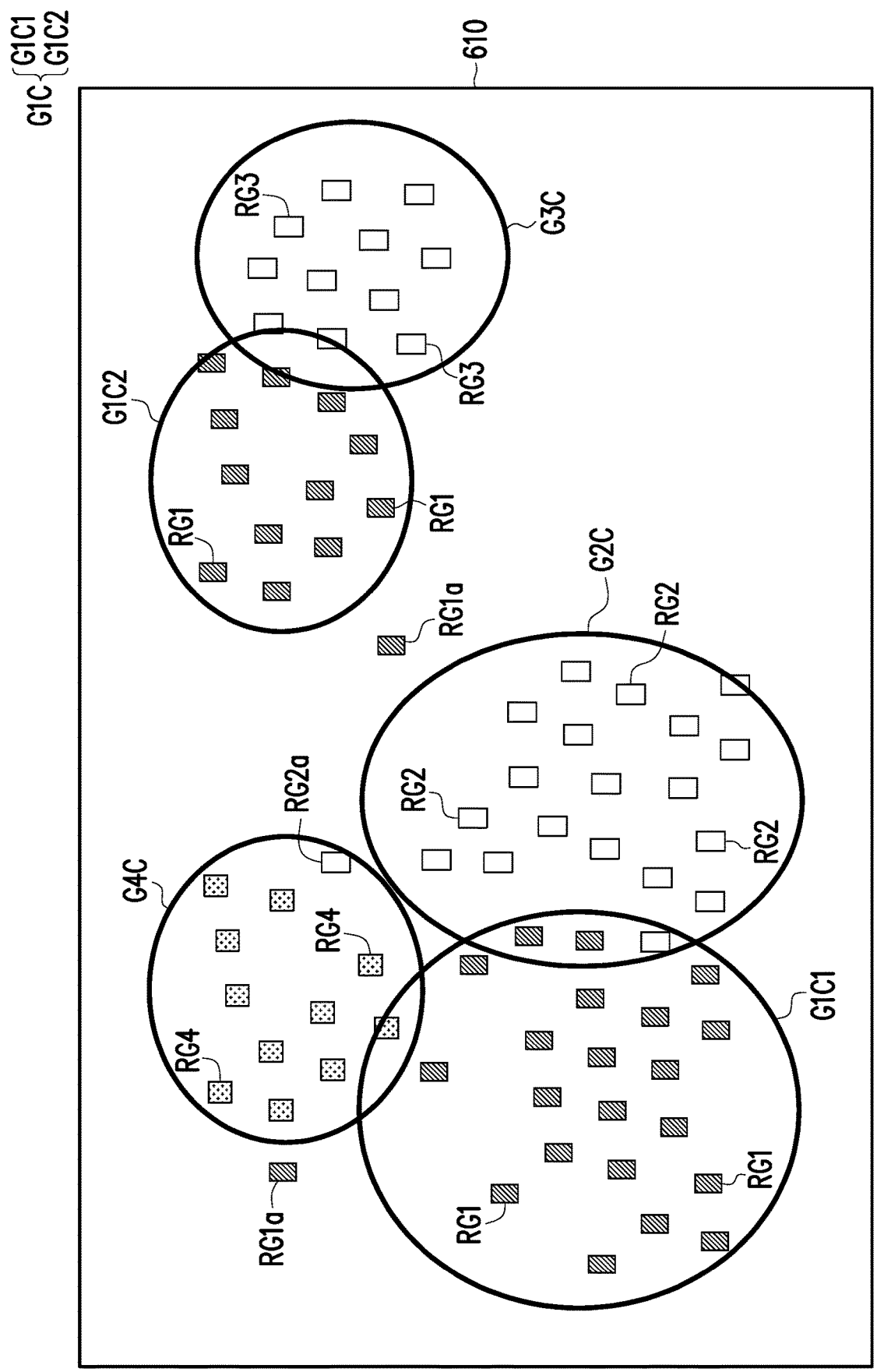
FIG. 6 is a schematic view illustrating the identifying operation of the adjacent state of the layout area of circuit group according to an embodiment of the disclosure.

Please refer to FIG. 6 below. FIG. 6 is a schematic view illustrating the identifying operation of the adjacent state of the layout area of circuit group according to an embodiment of the disclosure. After completing the grouping operation of multiple circuit groups in the circuit, the area of the physical layout of the multiple registers in the circuit group in the circuit can be analyzed.

In FIG. 6, the circuit layout 610 has a plurality of registers RG1 to RG4, RG1a, and RG2a. Specifically, the registers RG1 and RG1a belong to the same first circuit group; the registers RG2 and RG2a belong to the same second circuit group; the register RG3 belongs to the same third circuit group; and the register RG4 belongs to the same fourth circuit group. When identifying the adjacent state of the layout area of the circuit groups, a clustering analysis algorithm commonly known to those skilled in the art may be used, such as a K-average algorithm or a density-based spatial clustering of application with noise (DBSCAN) algorithm, or other clustering analysis algorithms to analyze the circuit layout 610, and multiple clustered distribution ranges G1C to G4C can be generated, and the adjacent state can be established according to the distance between the distribution ranges G1C to G4C.

It should be noted that the distribution ranges G1C to G4C respectively correspond to the first circuit group to the fourth circuit group. The distribution ranges G1C to G4C do not necessarily include all the registers of the corresponding circuit group. Taking the registers RG1a and RG2a as an example, since the registers RG1a and RG2a are far away from other registers RG1 and RG2 in the same circuit group, when performing the clustering operation, the registers RG1a and RG2a will be excluded. In addition, the distribution ranges G1C to G4C two by two may overlap each other and may not be isolated from each other. Moreover, the distribution range of the same cluster may be distributed in two separate areas, for example, the distribution range G1C is composed of sub-distribution ranges G1C1 and G1C2, and the sub-distribution ranges G1C1 and G1C2 are separated from each other.

Figure 7:
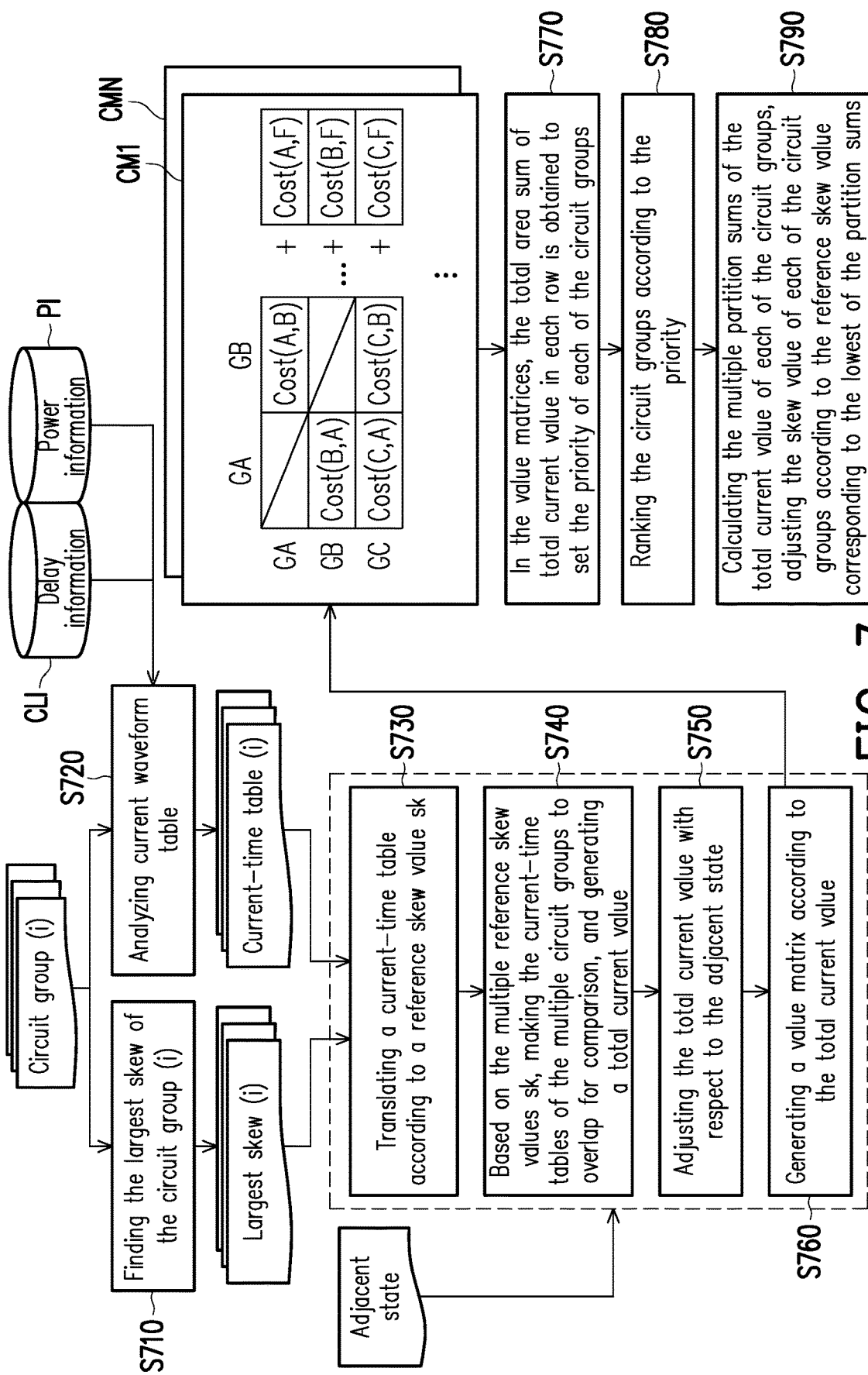
FIG. 7 is a flowchart illustrating an adjusting operation of the skew value of the circuit group according to an embodiment of the disclosure.
Figure 8:
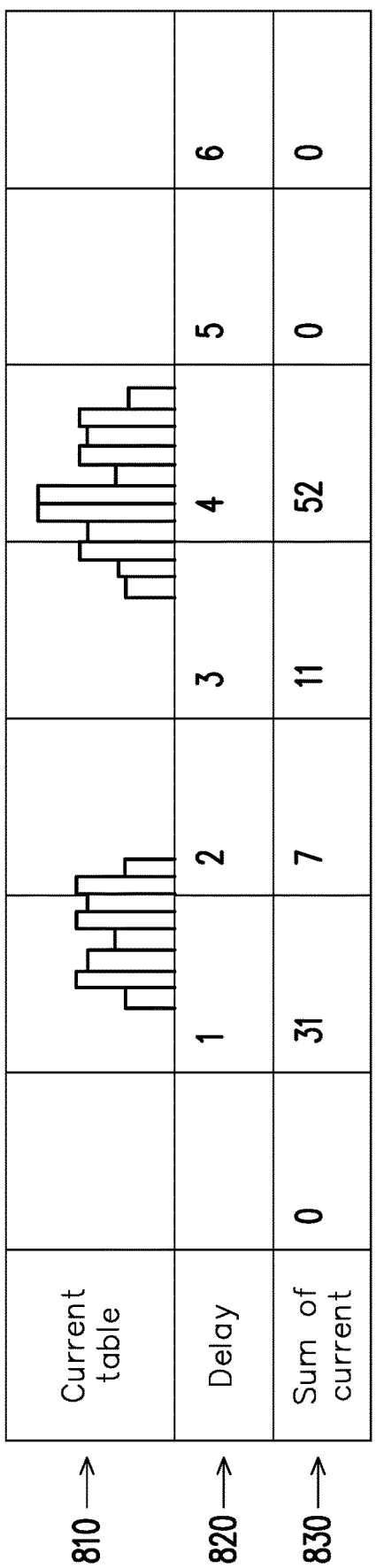
FIG. 8 is a schematic view of a current-time table according to an embodiment of the disclosure.

For the adjusting operation of the skew value of each of the circuit groups, please refer to the illustrations in FIG. 7 and FIG. 8. FIG. 7 is a flowchart illustrating an adjusting operation of the skew value of the circuit group according to an embodiment of the disclosure. FIG. 8 is a schematic view of a current-time table according to an embodiment of the disclosure.

In FIG. 7, in step S710, each circuit group (i) that has been grouped is received, and the largest skew (i) that is likely to be adjusted in the circuit group (i) is found. In step S720, a current waveform analysis is performed on each circuit group (i), and each circuit-time table (i) is obtained. Here, in step S720, the current waveform analysis of each circuit group (i) is performed through the delay information CLI of the clock signal and the power information PI. Specifically, the delay information CLI records the possible delay state of the clock signal when the circuit is working, and the power information PI records the power consumption state of the circuit when the circuit is working. The resulting current-time table is shown in FIG. 8. In the table, the first row records the ammeter 810 that shows current state distribution illustrated over time; the second row is the time axis 820 corresponding to the delay of the clock signal, wherein the time axis 820 is divided into multiple time intervals 0 to 6; the third row is the multiple current sums 830 corresponding to the time interval 0 to the time interval 6.

Step S730 performs the translating operation of each circuit-time table (i) according to a plurality of reference skew values sk smaller than the maximum skew (i). Step S740 makes the circuit-time table (i) corresponding to each circuit group (i) to translate based on the plurality of reference skew values sk, and makes the translated circuit-time table (i) to be overlapped with each other for comparison. In S750, the sum of the currents at different reference skew values between any two circuit groups is generated. In step S760, a value matrix CM is established based on the calculated sum of multiple current values. Specifically, the value matrix CM can be established according to the reference skew value sk, that is, the number of the value matrix CM is the same as the number of the set reference skew value sk.

Incidentally, when the relationship of the total current value between any two circuit groups is generated, the sum of each current value can be adjusted as appropriate according to the adjacent state of the circuit group. To explain briefly, when there is a relatively high level of adjacent state between two circuit groups (the distance between them is less than a first threshold), the corresponding total current value can be adjusted higher. Conversely, when there is a relatively low level of adjacent state between the two circuit groups (the distance between them is greater than a second threshold), there is no need to adjust the corresponding total current value. The above-mentioned second threshold may be greater than or equal to the first threshold.

In FIG. 7, a single value matrix (e.g., value matrix CM1) may correspond to one of multiple reference skew values sk. The value matrix CM1 records a total current value corresponding to any two of the multiple circuit groups GA to GF. Specifically, the total current value corresponding to the circuit groups GA and GB is denoted as Cost(A, B), and the rest can be deduced by analogy.

In step S770, in all the value matrices CM1 to CMN, the total current values respectively corresponding to each circuit group are added, and a total area sum corresponding to each circuit group is obtained. Taking the circuit group GA as an example, the total area sum corresponding to the circuit group GA is equal to the sum of the total current values Cost(A, B) to Cost(A, F) in all the value matrices CM1 to CMN. The total area sum corresponding to the circuit group GC is equal to the sum of the total current values Cost(C, A) to Cost(C, F) in all value matrices CM1 to CMN. Then, the priority of adjusting the skew values of the circuit groups GA to GF is set according to the magnitude of the total area sum corresponding to the circuit groups GA to GF. Specifically, in this embodiment, the priority of adjusting the skew values of the circuit groups GA to GF is positively related to the magnitude of the total area sum corresponding to the circuit groups GA to GF. In other words, if the circuit group GA has the largest total area sum, the circuit group GA is set with the highest priority.

In step S780, each circuit group GA to GF is ranked according to the priority obtained in step S770. In addition, in step S790, based on the priority, a plurality of partition sums of total current values of each of the circuit groups GA to GF are calculated respectively corresponding to each reference skew value sk. In detail, the so-called partition sum is the sum of all total current values Cost(A, B) to Cost(A, F) in the column of each circuit group (taking circuit group GA as an example) in a single value matrix (e.g., value matrix CM1). That is to say, corresponding to the circuit group GA, different partition sums can be calculated according to different value matrices CM1 to CMN. Then, the skew value of the circuit group GA is adjusted according to the reference skew value corresponding to the smallest of all the partition sums. For example, if the partition sum of the circuit group GA is the smallest in the value matrix CM1, and the value matrix CM1 corresponds to the skew value sk1, the skew value of the circuit group GA is adjusted according to the skew value sk1.

Figure 9:
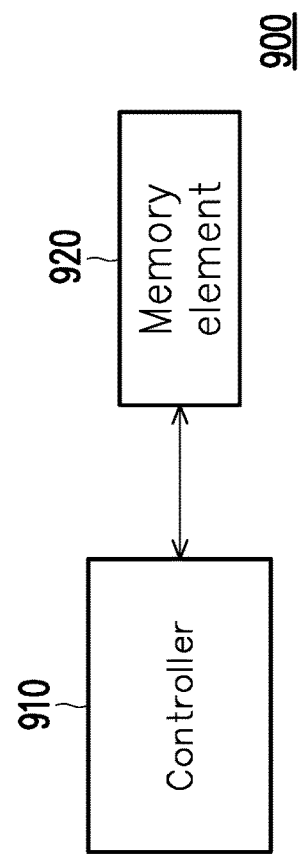
FIG. 9 is a schematic view of a circuit signal skew adjusting apparatus according to an embodiment of the disclosure.

In the following, please refer to FIG. 9, FIG. 9 is a schematic view of a circuit signal skew adjusting apparatus according to an embodiment of the disclosure. The adjusting apparatus 900 for adjusting the circuit signal skew includes a controller 910 and a memory element 920. The controller 910 is coupled to the memory element 920 for receiving a netlist of the circuit. The controller 910 is configured to perform the circuit signal skew adjusting method described in the above-mentioned embodiments, and by adding a delay element to each circuit group in the netlist of the circuit, the skew value of each circuit group is adjusted.

In the physical circuit, according to the adjusting operation of the skew value of the circuit group, the delay element added by the controller 910 can generate an adjusted netlist, and by adjusting the layout of the physical circuit, the performance of the generated integrated circuit can meet the expectations of design.

Incidentally, in this embodiment, the controller 910 may be a processor with computing capabilities. Alternatively, the controller 910 may be designed through a hardware description language (HDL) or any other design method of digital circuits commonly known to those skilled in the art, and can be a hardware circuit implemented through a field programmable logic gate array (FPGA), a complex programmable logic device (CPLD) or an application-specific integrated circuit (ASIC). In addition, the memory element 920 may be any type of storage medium such as various random access memories (RAM), flash memories, etc., but is not limited thereto.

In summary, the disclosure generates multiple circuit partitions by dividing circuits, and then simplifies the circuit configuration by grouping the circuit partitions. The disclosure analyzes the adjacent state of the layout area of the circuit group to adjust the skew value of each circuit group. In terms of circuit-based performance, it is possible to effectively reduce the time length to analyze, and improve the efficiency of the skew value adjusting operation.

What is claimed is:

1. A circuit signal skew adjusting method, comprising:
providing a controller to perform:
dividing, according to a netlist of a circuit, the circuit to generate a plurality of circuit partitions based on each of a plurality of clock signals;
grouping the plurality of circuit partitions respectively to obtain a plurality of circuit groups;
identifying an adjacent state of a layout area of the plurality of circuit groups; and
adjusting a skew value of each of the plurality of circuit groups according to the adjacent state,
wherein the step of identifying the adjacent state of the layout area of the plurality of circuit groups comprises:
establishing a plurality of physical layout areas of a plurality of corresponding registers in the plurality of circuit groups in the circuit; and
executing a clustering analysis algorithm to generate multiple clusters based on the plurality of physical layout areas; and
establishing the adjacent state according to a distribution range of each of the multiple clusters,
wherein the step of adjusting the skew value of each of the plurality of circuit groups according to the adjacent state comprises:
calculating a plurality of maximum possible skew values of the plurality of circuit groups respectively;
creating a plurality of current-time tables based on delay information of the plurality of clock signals and power information;
based on the adjacent state, establishing a plurality of value matrices corresponding to a plurality of reference skew values according to the plurality of maximum possible skew values and the plurality of current-time tables; and
determining an adjustment value of the skew value of each of the plurality of circuit groups according to the plurality of value matrices.

2. The adjusting method according to claim 1, wherein the circuit is divided according to a clock signal network of the netlist of the circuit to generate the plurality of circuit partitions.

3. The adjusting method according to claim 1, wherein the step of dividing the circuit according to the netlist of the circuit to generate the plurality of circuit partitions comprises:
tracking each of the clock signals to find a plurality of branch ports, and establishing a plurality of branch nodes of the corresponding circuit partition according to the number of control registers or power consumption of the control registers of the plurality of branch ports.

4. The adjusting method according to claim 3, wherein the step of establishing the plurality of branch nodes of the corresponding circuit partition according to the number of the control registers or power consumption of the control registers of the plurality of branch ports comprises:
comparing to determine whether the number of the control registers or the power consumption of the control registers of a first branch port is greater than a predetermined threshold; and
when the number of the control registers or the power consumption of the control registers of the first branch port is greater than the predetermined threshold, establishing a first branch node corresponding to the first branch port.

5. The adjusting method according to claim 4, further comprising:
tracking at least one second branch port corresponding to the first branch port;
comparing to determine whether the number of control registers or power consumption of control registers of the at least one second branch port is greater than the predetermined threshold, when the number of the control registers or the power consumption of the control registers of the at least one second branch port is greater than the predetermined threshold, establishing at least one second branch node corresponding to the at least one second branch port.

6. The adjusting method according to claim 1, wherein the step of grouping the plurality of circuit partitions respectively to obtain the plurality of circuit groups comprises:
establishing a corresponding partition tree for each of the circuit partitions, wherein the partition tree has a plurality of branch nodes, a plurality of branch nodes at bottom among the plurality of branch nodes respectively record a plurality of values, each of the values represents the number of control registers or power consumption of the control registers corresponding to each of the branch nodes; and
grouping the plurality of branch nodes based on uniformity of a sum of multiple group values of the plurality of circuit groups according to a partition algorithm.

7. The adjusting method according to claim 6, wherein the uniformity of the sum of the multiple group values can be obtained according to a standard deviation of the sum of the multiple group values.

8. The adjusting method according to claim 1, wherein the plurality of value matrices respectively correspond to the adjustment reference values, and each of the value matrices records a total current value generated corresponding to each of the plurality of reference skew values between any two of the plurality of circuit groups.

9. The adjusting method according to claim 1, wherein the step of establishing the plurality of value matrices corresponding to the plurality of reference skew values respectively according to the plurality of maximum possible skew values and the plurality of current-time tables comprises:
generating a plurality of total current values according to a comparison between the plurality of translated reference skew values based on any two of the current-time tables of the plurality of circuit groups; and
adjusting the plurality of total current values according to the adjacent state.

10. The adjusting method according to claim 1, wherein the step of determining the adjustment value of the skew value of each of the plurality of circuit groups according to the plurality of value matrices comprises:
in the plurality of value matrices, adding the total current values corresponding to the plurality of circuit groups respectively, and obtaining a plurality of total area sums corresponding to the plurality of circuit groups respectively; and
determining a priority of an adjusting operation for the skew values of the plurality of circuit groups according to the magnitude of the total current values.

11. The adjusting method according to claim 9, wherein the step of determining the adjustment value of the skew value of each of the plurality of circuit groups according to the plurality of value matrices further comprises:
based on the priority, calculating a plurality of partition sums of the total current values of each of the plurality of circuit groups respectively corresponding to the plurality of reference skew values; and
adjusting the skew value of each of the plurality of circuit groups according to the reference skew value corresponding to the lowest of the plurality of partition sums.

12. The adjusting method according to claim 1, wherein the step of adjusting the skew value of each of the plurality of circuit groups according to the adjacent state further comprises:
adding at least one delay element to each of the plurality of circuit groups to adjust the skew value.

13. A circuit signal skew adjusting apparatus, comprising:
a memory element; and
a controller, coupled to the memory element, and configured to:
divide, according to a netlist of a circuit, the circuit to generate a plurality of circuit partitions based on each of a plurality of clock signals;
group the plurality of circuit partitions respectively to obtain a plurality of circuit groups;
identify an adjacent state of a layout area of the plurality of circuit groups; and
adjust a skew value of each of the plurality of circuit groups according to the adjacent state,
wherein the controller is further configured to:
establish a plurality of physical layout areas of a plurality of corresponding registers in the plurality of circuit groups in the circuit;
execute a clustering analysis algorithm to generate multiple clusters based on the plurality of physical layout areas;
establish the adjacent state according to a distribution range of each of the multiple clusters;
calculate a plurality of maximum possible skew values of the plurality of circuit groups respectively;
create a plurality of current-time tables based on delay information of the plurality of clock signals and power information;
based on the adjacent state, establish a plurality of value matrices corresponding to a plurality of reference skew values according to the plurality of maximum possible skew values and the plurality of current-time tables; and
determine an adjustment value of the skew value of each of the plurality of circuit groups according to the plurality of value matrices.

* * * * *